US008638404B2

(12) United States Patent
    Arita (10) Patent No.: US 8,638,404 B2
(45) Date of Patent: Jan. 28, 2014

(54) PLANAR LIGHT SOURCE DEVICE AND LIQUID CRYSTAL DISPLAY DEVICE USING THE SAME

(75) Inventor: Kenji Arita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 477 days.

(21) Appl. No.: 12/910,189

(22) Filed: Oct. 22, 2010

(65) Prior Publication Data

US 2011/0096267 A1    Apr. 28, 2011

(30) Foreign Application Priority Data

Oct. 23, 2009    (JP) .................................. 2009-244470

(51) Int. Cl.
    *G02F 1/1333*    (2006.01)
(52) U.S. Cl.
    USPC ............................................. 349/58; 349/67
(58) Field of Classification Search
    USPC .................................... 349/58–59
    See application file for complete search history.

(56) References Cited

U.S. PATENT DOCUMENTS

| 6,935,766 B2* | 8/2005 | Ato ................................ 362/633 |
| 8,026,994 B2* | 9/2011 | Lee ................................. 349/58 |
| 2009/0153767 A1 | 6/2009 | Bae et al. |

FOREIGN PATENT DOCUMENTS

| JP | 2002-311430 | 10/2002 |
| JP | 2003-279939 | 10/2003 |
| JP | 2009-145858 | 7/2009 |

OTHER PUBLICATIONS

Notification of Reasons for Refusal issued Sep. 17, 2013 in Japanese patent application No. 2009-244470 w/English translation.

* cited by examiner

*Primary Examiner* — Eric Wong
(74) *Attorney, Agent, or Firm* — Oblon, Spivak, McClelland, Maier & Neustadt, L.L.P.

(57) ABSTRACT

A planar light source device including: a light source; an optical sheet that emits light incident from the light source; a rear frame that is disposed to support the optical sheet; and a reflection sheet, which is included inside the rear frame, and which includes the optical sheet, wherein the reflection sheet has a positioning portion including a notch portion and a bent portion, and wherein the optical sheet has a shape fitting to the positioning portion. The shape of the optical sheet may be not point-symmetrical and may be not line-symmetrical viewing from a light emitting direction.

5 Claims, 6 Drawing Sheets

PLANAR LIGHT SOURCE DEVICE AND LIQUID CRYSTAL DISPLAY DEVICE USING THE SAME

CROSS-REFERENCE TO RELATED APPLICATION

This application claims priority from Japanese Patent Application No. 2009-244470 filed on Oct. 23, 2009, the entire subject matter of which is incorporated herein by reference.

BACKGROUND

1. Technical Field

The present invention relates to a planar light source device used in an image display device such as a liquid crystal display device and a liquid crystal display device using the same.

2. Description of the Related Art

In a related planar light source device, for example a planar light source device for a non-spontaneous light-emitting display device such as a liquid crystal display device, a side light type (also called an edge light type) and a direct type are known. The side-light-type planar light source device has a structure in which a light source is disposed on a side surface portion of a mold frame included in a rear frame. The direct-type planar light source device has a structure in which a light source is disposed on a rear surface of a mold frame facing a display unit.

Further, in the side-light-type planar light source device, a light guiding plate is provided to guide the light emitted from the light source to a desired direction, and the light emitted from the light source, for example a line light source such as a cold cathode fluorescent lamp (hereinafter, referred to as a CCFL) or a point light source such as a light emitting diode (hereinafter, referred to as an LED), is reflected inside the light guiding plate. And then, the light is diffused by a diffusion pattern provided inside the light guiding plate, and the light is emitted to the light emission surface. When the light guiding plate is provided, a display panel such as a liquid crystal panel is provided on the display surface side of the light guiding plate. A front frame having an opening and supporting the display panel, a mold frame, and a rear frame are disposed on the display surface side of the display panel.

Furthermore, in order to efficiently emit the light emitted from the light source to the display panel, an optical sheet, for example a prism sheet for improving regularity or a reflection sheet for reflecting the light toward the light guiding plate or the display panel, is also provided. Here, the optical sheet is also accommodated between the rear frame and the mold frame as in the light source or the light guiding plate. In addition, the reflection sheet is disposed between the light guiding plate and the rear frame.

Accordingly, in the related planar light source device, the number of components was large. Specifically, the structure of the mold frame was complex and the cost of the mold was very expensive. Therefore, a related art is known for obtaining a cheap and light weight liquid crystal display device where the number of components thereof have been decreased by forming the reflection sheet and removing the mold frame (for example, refer to JP-A-2009-145858, Page 3 to 5, FIG. 1).

In the related art, when the optical member such as an optical sheet or a light guiding plate is provided, the optical member is disposed inside the reflection sheet, which was shaped, instead of the mold frame. For this reason, there is a problem that the positioning operation of the optical sheet is difficult when inserting the optical sheet. In addition, in the insertion operation of the optical sheet, there is also a problem that is called as erroneous insertion caused by the front side and the rear side of the optical sheet are reversed. However, such erroneous insertion of the optical sheet is not described in the JP-A-2009-145858.

SUMMARY

The present invention has been made with consideration of the above problem, and an object of the present invention is to provide a planar light source device in which a positioning operation of an optical member such as an optical sheet is easily performed, in the planar light source device in which the mold frame is replaced by a reflection sheet.

The planar light source device according to one aspect of the invention is a planar light source device without a mold frame, and the shaped reflection sheet has a portion, which is used to position the optical member such as an optical sheet.

According to the aspect of the invention, it is possible to obtain the planar light source device where the number of components can be decreased by removing the mold frame and the positioning operation of the optical member may be easily performed.

DETAILED DESCRIPTION OF THE EMBODIMENTS

Hereinafter, exemplary embodiments of the invention will be described. In the description below, the embodiments of the invention are described, but the invention is not limited to the embodiments below. In order to clarify the description, appropriate omissions and simplifications are made in the description below. In addition, the respective components of the embodiments below may be easily changed, added, and modified by the person skilled in the present invention.

First Embodiment

Figure 1:
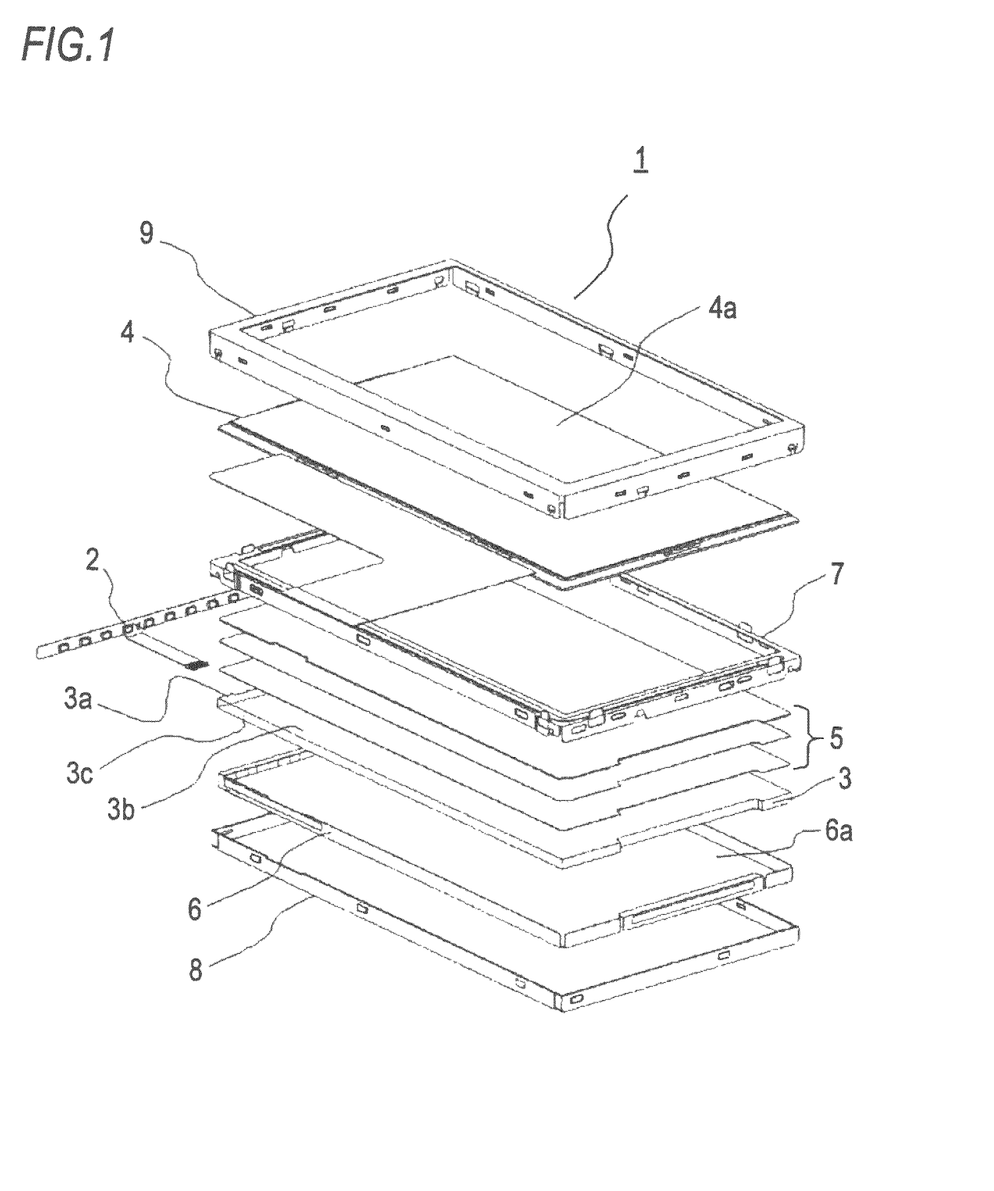
FIG. 1 is an exploded perspective view illustrating a liquid crystal display device using a planar light source device according to a first embodiment of the invention.
Figure 2:
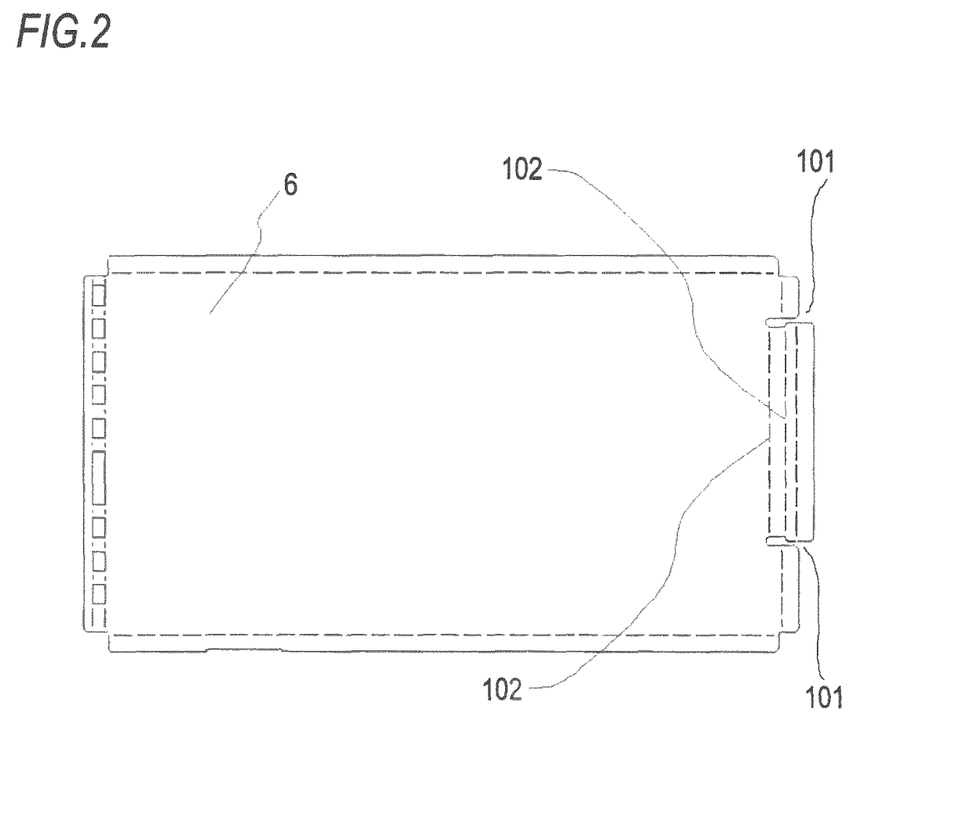
FIG. 2 is a development view illustrating a reflection sheet according to a first embodiment of the invention.
Figure 3A:
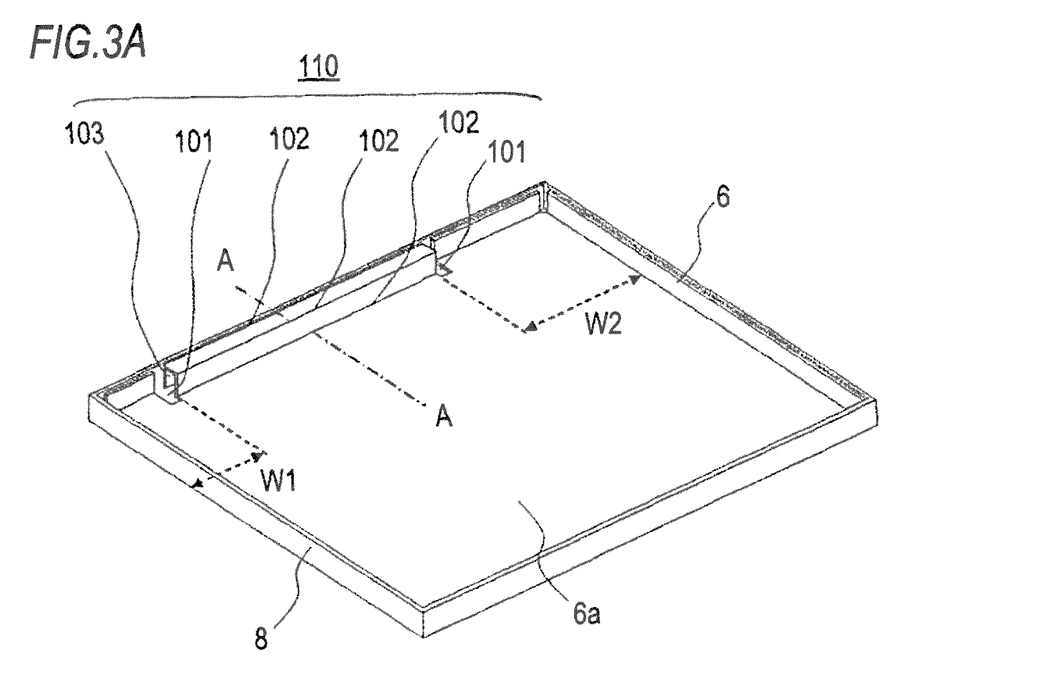
FIG. 3A is a perspective view illustrating a shape in which the reflection sheet is bent according to the first embodiment of the invention.
Figure 3B:
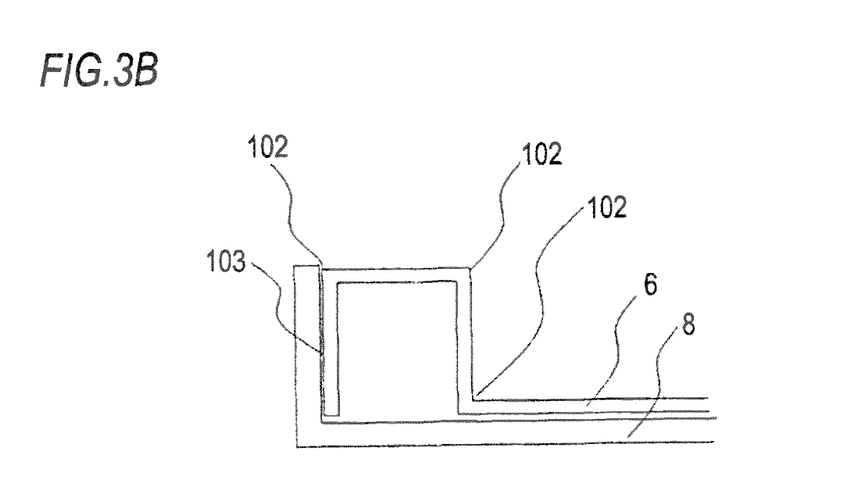
FIG. 3B is a cross-sectional view illustrating the same.
Figure 4A:
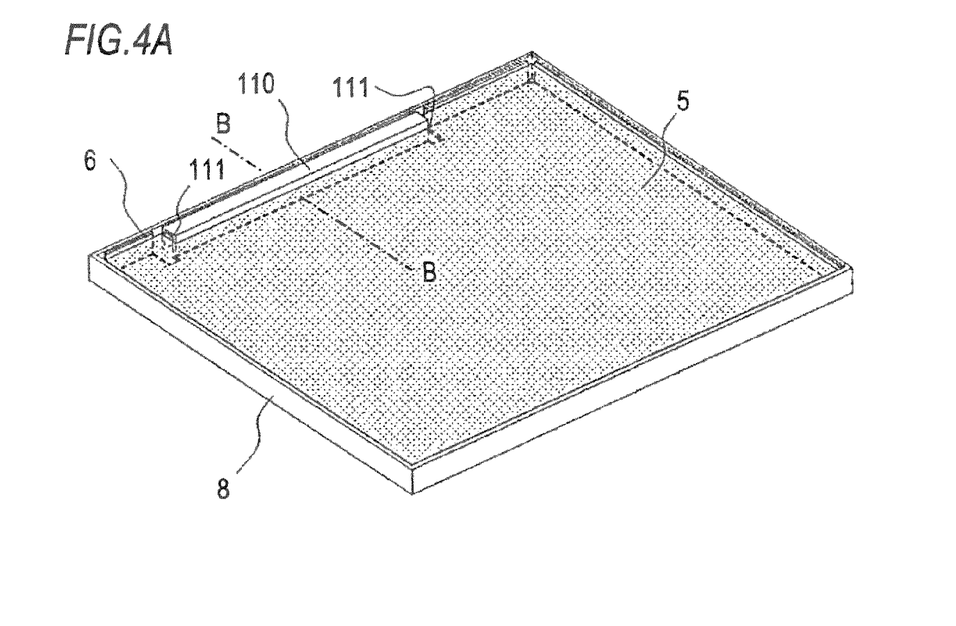
FIG. 4A is a perspective view illustrating a shape in which a light guiding plate and an optical sheet are inserted to the reflection sheet according to the first embodiment of the invention.
Figure 4B:
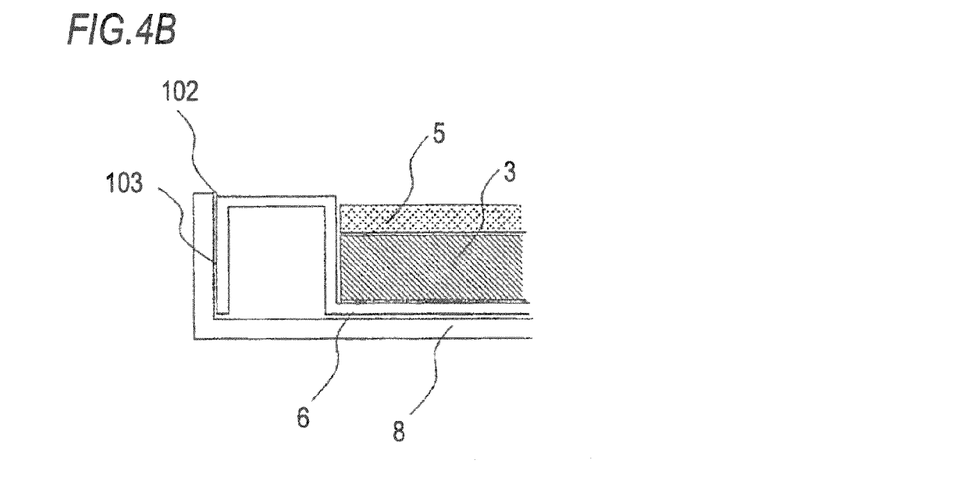
FIG. 4B is a cross-sectional view illustrating the same.

The first embodiment will be described in accordance with the drawings. FIG. 1 is an exploded perspective view illustrating a liquid crystal display device using a planar light source device according to the first embodiment of the invention. FIG. 2 is a development view illustrating a reflection sheet according to the first embodiment of the invention. FIG. 3A is a perspective view illustrating a shape in which the reflection sheet is bent according to the first embodiment of the invention, and FIG. 3B is a cross-sectional view illustrating the same. FIG. 4A is a perspective view illustrating a shape in which a light guiding plate and an optical sheet are inserted to the reflection sheet according to the first embodiment of the invention, and FIG. 4B is a cross-sectional view illustrating the same.

A planar light source device 1 is shown in FIG. 1. A light source 2 is disposed around a side surface 3a of a light guiding plate 3. Light emitted from the light source 2 is incident from the side surface 3a of the light guiding plate 3, and is emitted from a light emission surface 3b of the light guiding plate 3 (here, the light emission surface indicates an upper surface of the light guiding plate 3 in the showing figure).

The light emission surface 3b of the light guiding plate 3 is provided with an optical sheet 5, for examples a diffusion sheet for equally illuminating a display panel 4 by diffusing the light emitted from the light source 2 or a lens sheet for improving luminance of a forward direction of a display surface 4a of the display panel 4 by changing an angle of the light emitted from the light source 2.

In addition, an facing light emission surface 3c of the light guiding plate 3 (here, the facing light emission surface indicates the lower surface of light guiding plate 3 in the showing figure) is provided with a reflection sheet 6 having a reflection surface 6a for effectively reflecting the light emitted from the light source 2 to the light emission surface 3b of the light guiding plate 3. Here, the reflection sheet 6 is bent in a box shape so that the reflection surface 6a faces the inside, and the light guiding plate 3 or the optical sheet 5 are disposed therein. A detailed description thereof will be made later.

Then, the light source 2, the light guiding plate 3, and the optical sheet 5 are sandwiched between a middle frame 7 and a rear frame 8 which are made of metal.

In addition, the light source 2, the light guiding plate 3, the display panel 4, the optical sheet 5, the reflection sheet 6, and the middle frame 7 are supported by a front frame 9 having an opening.

Further, the light source 2 is provided only in one side surface 3a of the light guiding plate 3 in FIG. 1, but the invention is not limited thereto. For example, the light source and the light source substrate may be provided in two or more side surfaces of the light guiding plate. An example of the light source 2 includes a point light source such as an LED or a laser diode. In the case of using the point light source, the point light source is used while being mounted to the light source substrate.

Furthermore, the light guiding plate 3 is formed of glass or resin, such as polyethylene terephthalate (PET), acrylate (PMMA), polycarbonate (PC) or cyclo olefin. The facing light emission surface 3c of the light guiding plate 3 is provided with a light scattering portion (not shown) which guides the light to the light emission surface 3b by scattering the propagation direction of the light. The light scattering portion functions as a means for extracting the light from the light guiding plate 3 by scattering the total reflection conditions of the light propagated to the inside of the light guiding plate. Specifically, an example of the scattering means includes a method of printing a dot pattern on the facing light emission surface 3c of the light guiding plate 3, a method of making the facing light emission surface 3c a rough surface, or a method of forming an uneven portion such as a minute spherical surface or a prism on the facing light emission surface 3c to change the propagation direction of the light.

Moreover, the optical sheet 5 may employs, for example, a configuration in which the lens sheet is sandwiched by the diffusion sheet. The method of improving the luminance of the display panel 4 may be performed by a combination of a plurality of lens sheets in consideration of the direction of the prism formed on the surface of the lens sheet. Two or more diffusion sheets may be used in combination in order to improve the diffusion characteristic. Preferably, the use of the optical sheet 5 is optimized in consideration of the desired luminance or light distribution characteristic.

In addition, a box-shaped sheet is formed as the reflection sheet 6, which is made of a material obtained by mixing barium sulfate or titanium dioxide with polypropylene (PP) or polyethylene terephthalate (PET), a material obtained by forming minute bubbles in a resin, a material obtained by depositing silver on a metal plate, or a material obtained by coating material containing titanium dioxide or the like on a metal plate. Accordingly, a mold frame used in the past is not required, which contributes to a decrease in the number of components or a decrease in the cost of the die.

Here, the bent shape of the reflection sheet according to the first embodiment of the invention will be described with reference to FIGS. 2, 3, and 4.

FIG. 2 is a development view before the reflection sheet is bent, and the reflection sheet 6 has a shape of one sheet. In order to form the box shape as shown in FIG. 1, the reflection sheet 6 may be bent along a bent portion 102 depicted by the dotted line of FIG. 2. In addition, a notch portion 101 is formed at two positions of one side. These notches are used to form a positioning portion to be described later and notch portion 101 will be described later.

FIG. 3A is a perspective view illustrating a shape in which the reflection sheet is bent, and FIG. 3B is a cross-sectional view taken along the dashed-dotted line A-A of FIG. 3A inside the rear frame. In FIG. 3A, the periphery of the reflection sheet 6 is bent along the inner wall of the rear frame 8. That is, the reflection sheet 6 is bent and formed into a box shape inside the rear frame 8. In addition, the reflection sheet 6 has the reflection surface 6a, which is reflecting light, and the inside of the box is formed as reflection surface 6a.

Here, the positioning portion 110 of the reflection sheet 6 will be described with reference to FIGS. 3A and 3B. The positioning portion 110 includes the notch portion 101, the bent portion 102, and a contact surface 103 contacting the inner wall of the rear frame 8. In addition, the reflection sheet 6 is bent at the bent portion 102 in an area where the reflection sheet can be bent by the notch portions 101 formed at least at two positions. The bent portion 102 is formed to include at least one mountain fold and at least one valley fold. In addition, the contact surface 103 as the end of the bent reflection sheet 6 contacts the inner wall surface of the rear frame 8.

As shown in FIG. 3A, the area bent by the bent portion 102 interposed between the notch portions 101 contributes to the positioning operation of the light guiding plate 3 or the optical sheet 5, which is shown in the perspective view of FIG. 4A. FIG. 4A shows a shape in which the optical sheet 5 and the light guiding plate 3 having a concave-shaped recess 111 fitted to the positioning portion 110 formed by bending the bent portion 102 interposed between the notch portions 101 formed at two positions are included in the reflection sheet 6. In addition, FIG. 4B is a cross-sectional view taken along the line B-B of FIG. 4A.

As shown in FIG. 4, according to the first embodiment of the invention, even in the planar light source device without the mold frame, it is possible to perform the positioning operation of the light guiding plate or the optical sheet by forming the reflection sheet to have the positioning portion.

Here, the shape of the light guiding plate 3 or the optical sheet 5 is not limited to the shape depicted in the drawing. In summary, the light guiding plate 3 or the optical sheet 5 may have a shape corresponding to the positioning portion 110 formed by the reflection sheet 6. In addition, a plurality of the positioning portions 110 may be provided in one side of the reflection sheet 6, or may be provided in a plurality of sides of the reflection sheet 6.

In addition, in the first embodiment, a structure in which the contact surface 103 is provided in the positioning portion 110 has been described. By using the contact surface 103, there are advantages that the strength of the positioning portion 110 is increased and the positioning operation may be further reliably performed. But, the positioning effect may be obtained without the contact surface 103.

Further, in the first embodiment of the invention, the positioning portion 110 may be provided at the center of the side of the optical sheet 5 or the light guiding plate 3, but may be provided at a position other than the center as shown in FIG. 3A. That is, the positioning portion 110 may be disposed at a position to make a difference between W1 and W2 shown in FIG. 3A. In other words, the shape of the optical sheet or the light guiding plate when seen from the display surface may have a shape which is not point-symmetrical or line-symmetrical, and a shape corresponding to the positioning portion 110. In this case, there are advantages that the positioning operation of the optical sheet or the light guiding plate may be performed, and the erroneous inserting operation of the optical sheet may be prevented.

Second Embodiment

When the reflection sheet is bent and molded to removed the mold frame, it is supposed that a gap may be formed at four corner portions. When the mold frame is prepared as the related art, such a gap is blocked. However, in the structure in which the mold frame is replaced by the reflection sheet, light leaks from the gap. For this reason, there are problems in that the amount of light contributing to the display is decreased, and the display characteristics are degraded. In addition, there is a problem in that a display error such as point defects or line defects is caused by foreign substances entering from the gap. The related art (such as JP-A-2009-145858) describes the state of improving the efficiency of the light by removing the gap at four corner portions, but the detailed embodiment thereof is not described.

In the second embodiment, in the planar light source device in which the mold frame is replaced by the reflection sheet, a gap of the reflection sheet deviates from a gap of the rear frame in order to provide the planar light source device capable of suppressing the entry of foreign substances or the degradation of the light efficiency caused by the leakage of light related to the gap of the reflection sheet. Accordingly, the planar light source device may have an advantage that the number of components is deceased by removing the mold frame and the entry of foreign substances or the leakage of light caused by the gap of the reflection sheet can be suppressed.

In the second embodiment, the description of the contents similar to the first embodiment and particularly the contents of FIG. 1 will be omitted.

Figure 5:
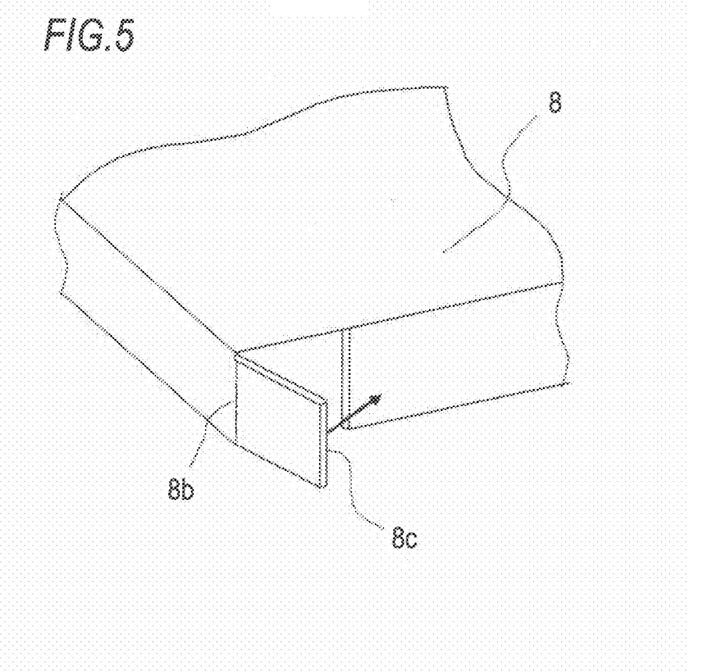
FIG. 5 is a perspective view illustrating a shape during a rear frame is being bent at a corner portion of the rear frame according to the second embodiment of the invention.

FIG. 5 is a perspective view illustrating a shape of the processing corner portion of the rear frame 8 viewed from the outside of the planar light source device. In order to form the rear frame 8 in a box shape, a notch is provided in advance around each of the corner portions, and each side is bent. In FIG. 5, it is depicted that the rear frame 8 is bent at a corner portion bending position 8b indicated by the dotted line. That is, a front end portion 8c of a extension portion extending from the corner portion bending position 8b is aligned to a position notched in advance along the side of the rear frame 8, which shows a shape during the process of forming the rear frame 8 in a box shape.

Figure 6:
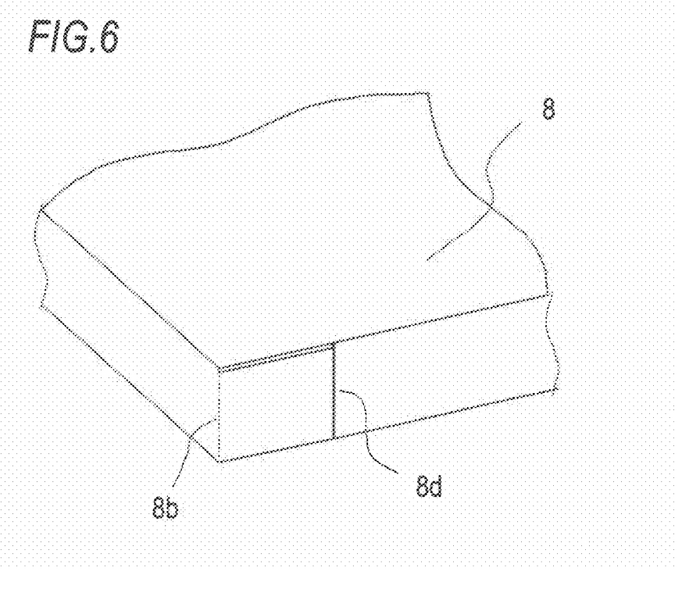
FIG. 6 is a perspective view illustrating a shape during when the rear frame is being bent at the corner portion of the rear frame according to the second embodiment of the invention.

Here, the angle of bending the rear frame 8 at the corner portion bending position 8b is substantially a right angle, and the shape of the rear frame 8 having a box shape is shown in FIG. 6. In FIG. 6, a butt portion 8d is simultaneously formed by aligning the position notched along the side of the rear frame 8 with the front end portion 8c. Since the butt portion 8d makes a gap, unless the gap is not blocked, the gap is used as a path where light leaks from the light source 2 or foreign substances enter.

Figure 7:
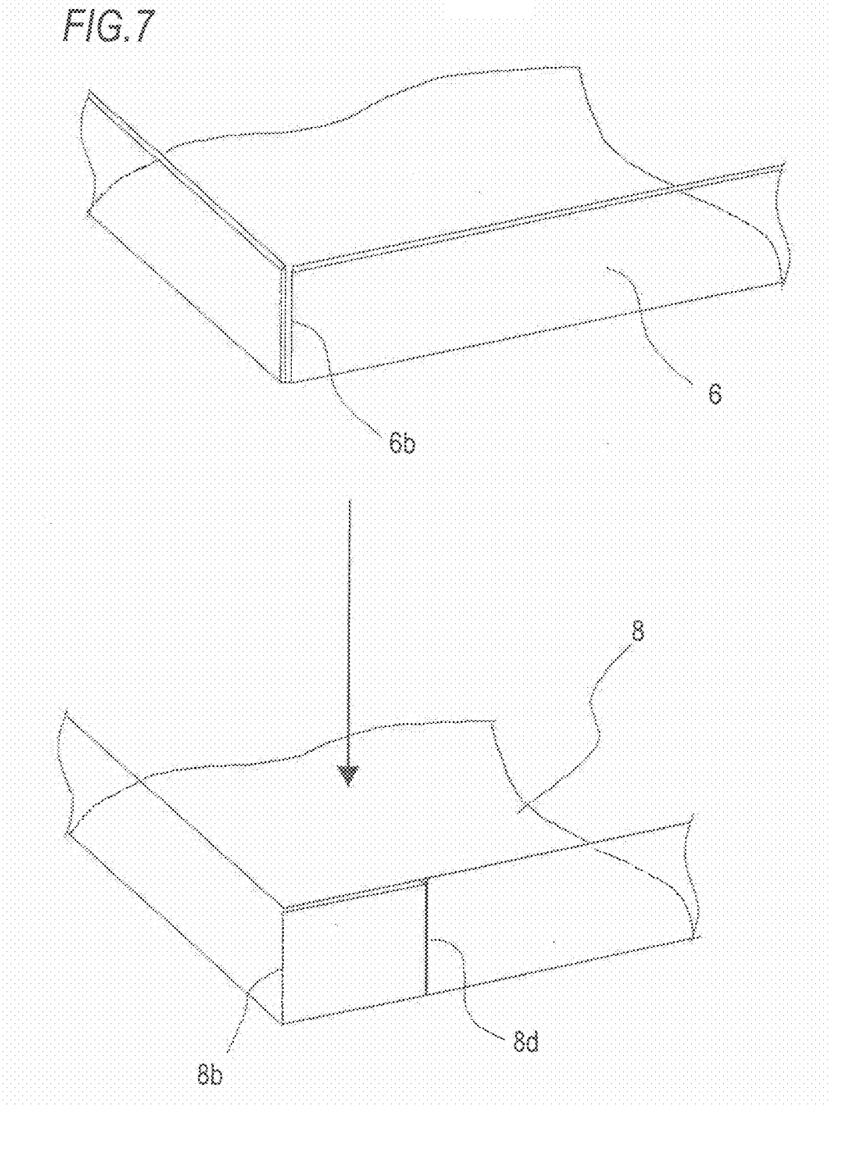
FIG. 7 is a perspective view illustrating the vicinity of the corner portion when the reflection sheet and the rear frame are fitted to each other in the second embodiment of the invention.

Here, as shown in FIGS. 1 and 2, since the reflection sheet 6 is formed to be fitted to the rear frame 8, the shape of the corner portion of the rear frame 8 is shown in FIG. 7. In addition, in FIG. 7, it needs to be noted that the rear frame 8 is viewed in a direction different from that of FIG. 5 or 6 in order to show a shape where the rear frame 8 and the reflection sheet 6 are fitted to each other.

In FIG. 7, a gap 6b is formed at the corner portion of the reflection sheet 6. This gap is not formed on purpose, but is formed during the process of forming the reflection sheet 6 by bending one sheet. Here, since the gap 6b of the reflection sheet 6 is deviated from the butt portion 8d of the rear frame 8, they do not overlap with each other when the rear frame 8 and the reflection sheet 6 are fitted to each other. That is, in the second embodiment of the invention, since the gaps of the rear frame and the reflection sheet are blocked, there is an advantage that troubles involved with the entry of foreign substances or the leakage of the light caused by the gaps may be suppressed.

The second embodiment has a structure in which the gap 6b of the reflection sheet 6 is the corner portion, and the butt portion 8d of the rear frame 8 is deviated from the corner portion, but this structure is not essential. It is supposed that the same advantage may be obtained even when the corner portion and the butt portion are deviated from each other without aligning them.

Further, in FIG. 7, the state of the invention has been described which can suppress the entry of foreign substances or the leakage of light by covering the gap of the butt portion 8d with the reflection sheet 6. However, since the reflection sheet 6 has a small degree of transmissivity, the leakage of light cannot be completely blocked. In this case, by covering the butt portion 8d while the reflection sheet extends along the circumference of the middle frame 7, it is possible to further improve the light shielding property and the efficiency of light. In addition, the leakage of light may be reduced in such a way that a folding-back portion is formed in the end portion of the reflection sheet 6 with respect to any side of the butt portion 8d so as to overlap with the butt portion 8d.

Furthermore, in the second embodiment, an example of using the light guiding plate has been described, but for example, the invention may be applied to a planar light source device without the light guiding plate.

What is claimed is:

1. A planar light source device comprising:
   a light source;
   an optical sheet that emits light incident from the light source;

a rear frame that is disposed to support the optical sheet; and a reflection sheet, which is included inside the rear frame, and which includes the optical sheet, wherein the reflection sheet has a positioning portion including a bent portion, wherein the optical sheet has a shape corresponding to a shape of the positioning portion as viewed from the light emitting direction, and wherein the shape of the optical sheet is not point-symmetrical with respect to a center point of the rear frame, as viewed from a light emitting direction, and wherein the shape of the optical sheet is not line-symmetrical with respect to a line, which is perpendicular to a peripheral edge of the rear frame and passes through a center point of the rear frame, as viewed from the light emitting direction.

2. The planar light source device according to claim 1, wherein the reflection sheet comprises a contact surface, which is provided at an end portion of the bent portion, and which contacts an inner wall of the rear frame.

3. The planar light source device according to claim 1, wherein the bent portion includes at least one mountain fold and at least one valley fold.

4. The planar light source device according to claim 1,
wherein the a reflection sheet is formed into a box shape having a corner portion formed by two adjacent sides and is included inside the rear frame,
wherein the rear frame comprises:
a corner bending portion disposed at a position corresponding to the corner portion;
a front end portion extending from the corner bending portion; and
a butted portion disposed at a position facing to the front end portion, and
wherein the rear frame is formed into a box shape.

5. A liquid crystal display device comprising:
a planar light source device comprising:
a light source;
an optical sheet that emits light incident from the light source;
a rear frame that is disposed to support the optical sheet; and
a reflection sheet, which is included inside the rear frame, and which includes the optical sheet,
wherein the reflection sheet has a positioning portion including a bent portion,
wherein the optical sheet has a shape corresponding to a shape of the positioning portion as viewed from the light emitting direction, and
wherein the shape of the optical sheet is not point-symmetrical with respect to a center point of the rear frame, as viewed from a light emitting direction, and
wherein the shape of the optical sheet is not line-symmetrical with respect to a line, which is perpendicular to a peripheral edge of the rear frame and passes through a center point of the rear frame, as viewed from the light emitting direction.

* * * * *